Feb. 9, 1960   J. ZAJAC ET AL   2,924,464
ARTICULATING COUPLINGS FOR ARTICULATED VEHICLES
Filed April 2, 1958   3 Sheets-Sheet 1

INVENTORS.
Josef Zajac
BY Pavel Schön
Stanislav Cernoch

Feb. 9, 1960     J. ZAJAC ET AL     2,924,464
ARTICULATING COUPLINGS FOR ARTICULATED VEHICLES
Filed April 2, 1958     3 Sheets-Sheet 3

INVENTORS.
Josef Zajac
BY Pavel Schön
Stanislav Černoch

United States Patent Office 2,924,464
Patented Feb. 9, 1960

2,924,464
ARTICULATING COUPLINGS FOR ARTICULATED VEHICLES

Josef Zajac, Stramberk, Pavel Schön, Mistek, and Stanislav Černoch, Zenklava, Czechoslovakia Application April 2, 1958, Serial No. 726,009

Claims priority, application Czechoslovakia May 3, 1957

10 Claims. (Cl. 280—421)

The invention relates to articulating couplings for articulated vehicles.

The known couplings have the disadvantage that either there is no automatic connection of the electrical, pneumatic and hydraulic circuits or only a partial connection is provided so that the ultimate connection has to be made with the aid of cables and flexible pipes by hand. In some instances, only the pneumatic piping and the electrical cables are connected automatically. In the latter case the entire hydraulic system for operating loading devices and the like is mounted on the trailer and is operated by hand.

The disadvantages described are obviated by the present invention, in which the electrical wiring, the air piping for the trailer brakes, and finally the hydraulic piping for operating the trailer attachments are connected automatically. According to the invention, the connecting and disconnecting of the trailer coupling can be controlled from the driver's control position, without the driver having to get out of the motor vehicle in order to manipulate the device.

Acocrding to the present invention there is provided an articulated coupling for an articulated vehicle whereof one part comprises a hub having a vertical axis and separate coupling elements for pneumatic, hydraulic and electric services disposed within the hub and whereof the other part comprises a bearing for supporting the hub when the coupling is engaged, a hollow pivot pin mounted in the bearing for vertical movement therefrom into the hub, power means for moving the pivot pin vertically in the bearing, locking means for locking the pivot pin in its upper position and separate coupling elements for pneumatic, hydraulic and electrical services disposed within the pivot pin each to engage automatically the corresponding element in the hub when the pivot pin is engaged in the hub.

Preferably the hydraulic coupling elements comprise a connecting tube fixed within the hub and formed with a lateral port adjacent its end, means for connecting the port to a hydraulic system, a valve sleeve slidable on the tube and biased to close the port, a slide valve mounted within a bore in the pivot pin, biased to close but opened by the connecting tube when it enters said bore, the pivot pin being arranged to displace the valve sleeve to open its port when the connecting tube enters the bore, and means for connecting the said slide valve to a hydraulic circuit. The pneumatic coupling elements may comprise a skirt surrounding the connecting tube to provide an annular air space, means for connecting said annular space to a pneumatic system, a hollow body provided within the pivot pin, through which hollow body the said bore extends, which enters the air space provided by the skirt when the pivot pin is raised into the hub, and is formed with a passage leading to a valve chamber around the slide valve, a valve seating within the chamber, a second valve mounted on the slide valve and normally seated on the valve seating but moving away from the seating when the slide valve is displaced inwardly in the bore, and means for connecting the valve chamber to a pneumatic system.

An embodiment of the invention, will now be described, by way of example only, with reference to the accompanying drawings in which.

Figure 1:
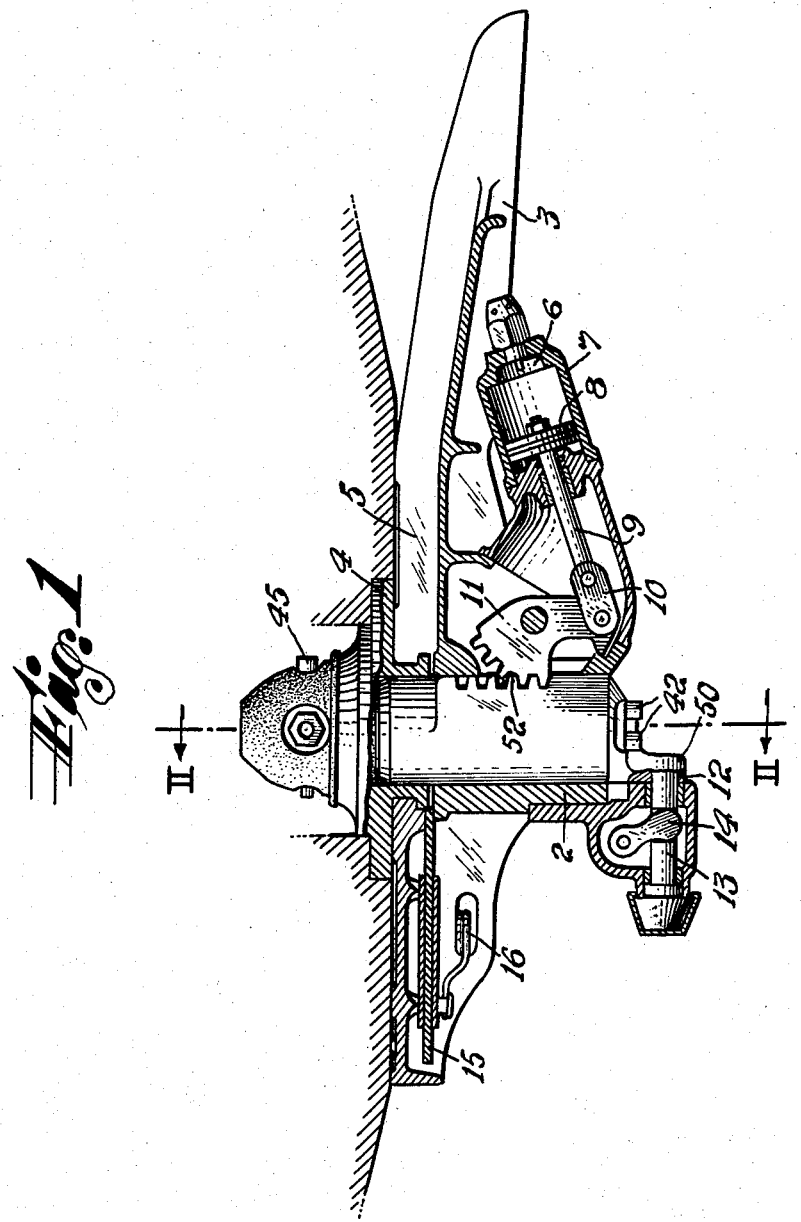
Figure 1 shows a longitudinal section through the coupling in the connected position.

A vertical pivot pin 1 is slidable in a bearing 2 of the coupling body or fifth wheel plate 3 and is provided with rack teeth 52 with which a toothed sector 11 meshes. The sector is connected with a piston 8 of an air cylinder 7 by a pullrod 10 and a piston rod 9. The pin 1 is locked by means of a locking pin 13 which has a recess to receive the head of a lever 14. The coupling has a movable cover 15 which automatically covers the aperture of the bearing 2 under the action of a torsion spring 16. The channel 5 of the body 3 serves as a guide to receive a hub 4 which is rigidly mounted on the trailer. Inside the pivot pin 1 of the coupling and the hub 4 on the trailer are incorporated devices for the automatic connection of the electrical, pneumatic and hydraulic lines.

Figure 2:
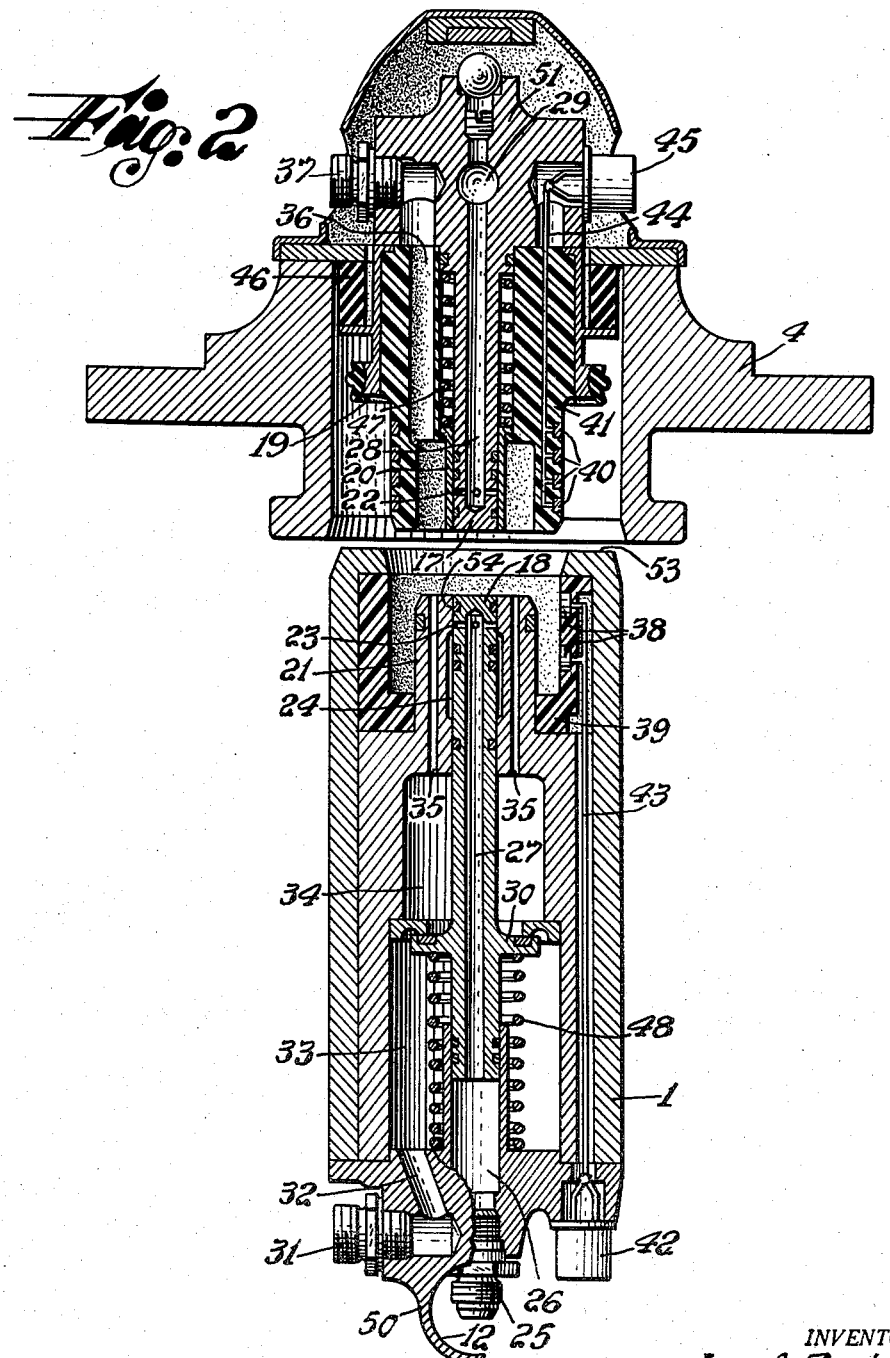
Figure 2 shows a section through the pivot pin and hub of the coupling of Fig. 1 in the disconnected position, the section being taken on line II—II.

A hollow body 21, is mounted in the pivot pin 1 and has a slide valve 18 integrally connected with a valve 30 mounted within it. The slide valve 18 is urged towards its upper position as shown in Figure 2 by a spring 48. The central part of the pin 1 also contains an insulating insert 39 with contacts 38 connected by conductors 43 to a receptacle 42. The lower part of the pin 1 is closed by a cover 50 containing the conduits 32 and 26, provided with coupling elements 31 and 25, of the pneumatic and hydraulic piping respectively.

An insulating insert 41 is elastically mounted on a rubber holder 46 in the upper part of the hub 4 and is provided with eight segments 40 conductively connected by electric conductors 44 with a receptacle 45. A connector body 51 is mounted in the insulating insert 41 and is formed with a connecting tube 17 which is covered by a valve sleeve 20, pressed downwards by a spring 47. The lower portion of the insert 41 forms a cylindrical skirt spacedly surrounding the free end of tube 17.

As soon as the hub 4 of the trailer, after displacing the cover 15 reaches the end of the guide channel 5 in the body 3, compressed air is admitted by the driver from the compressed-air system of the towing vehicle to the chamber 6 of the air cylinder 7. The piston 8 is displaced towards the left and in this way rocks the sector 11 and raises the pin 1 into the hub 4 on the trailer. The aperture 12 in the cover 50 on the lower part of the pin 1 is thereby aligned with the locking pin 13. The pin 13 is inserted into the aperture 12 by means of the lever 14 which is operated from the control position of the driver by a mechanical linkage, whereby the pivot pin 1 is locked.

When the trailer is disconnected and the hub 4 of the trailer is withdrawn from the guide 5, the cover 15, biased by the spring 16, covers the upper part of the pin 1.

Figure 3:
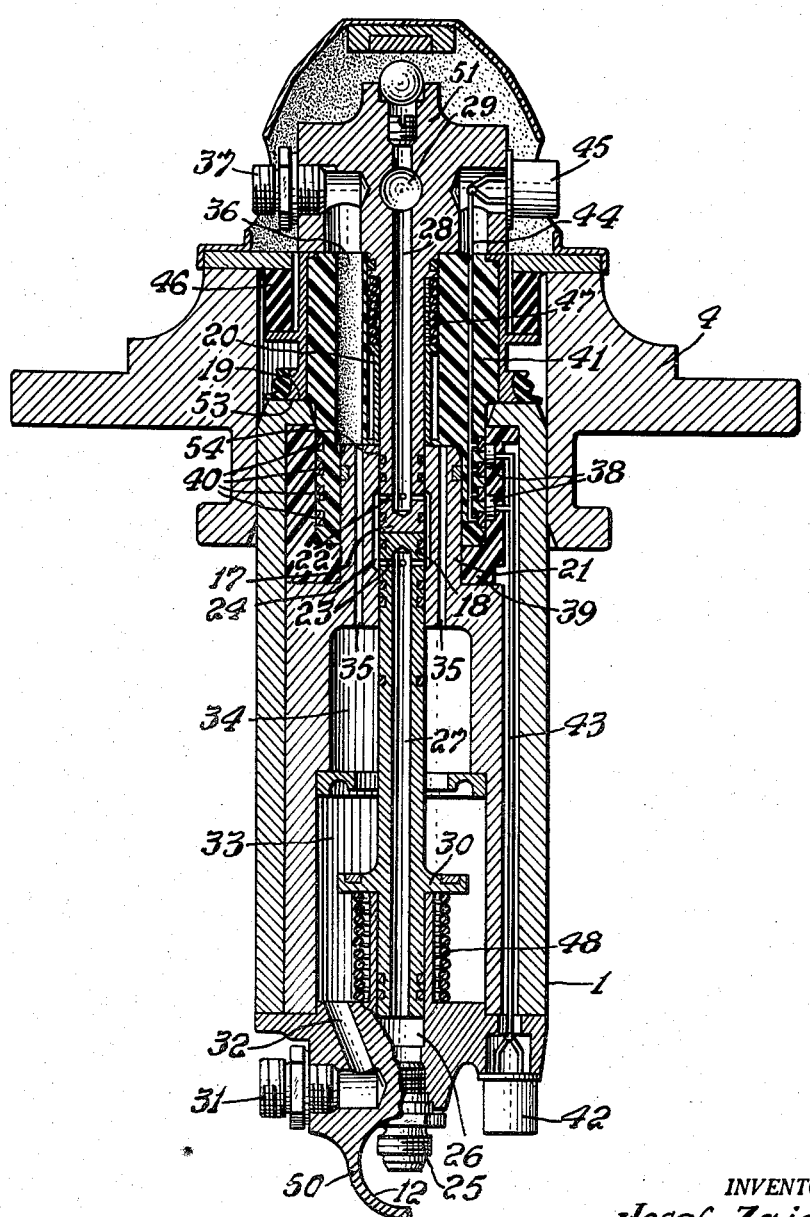
Figure 3 illustrates the device of Fig. 2 in the connected position.

Figs. 2 and 3 which illustrate axial sections through the movable pivot pin 1 and the hub 4 show the means for the automatic connection of the electrical, pneumatic, and hydraulic circuits. The device operates as follows:

The movable pivot pin 1 is moved upwards into the hub 4 until the connecting tube 17 strikes the top of the slide valve 18. The pivot pin 1 continues to move upwards until its end face 53 engages a stop 19. During this movement the slide valve 18 is pushed down and the connecting tube 17 enters the central bore 54 of the body 21 the top of which engages and lifts the valve sleeve 20. As soon as the end face 53 of the pivot pin 1 abuts against the stop 19, a connection is formed between ports 22 of the fixed connecting tube 17 and ports 23 of the slide valve 18 through a recess 24 formed in the body 21 so that the pressure liquid flows through the coupling element 25, through the conduits 26 and 27, the ports 23, the recess 24, the ports 22 into the bore 28 of the tube 17 and through a passage 29 into the hydraulic connector of the trailer. The upward displacement of the pivot pin 1 opens the air valve 30 so that compressed air can flow through the coupling element 31, through the conduit 32, across the space 33, into the valve chamber 34, hence through passages 35 of the body 21 into the passage 36, and from there through the connector 37 into the brake system of the trailer.

The electrical circuit is connected with the aid of the eight contacts 38, resiliently mounted in the insulating insert 39 which slide on the eight conductive segments 40 of the insulating insert 41. Electric current flows through the receptacle 42, the electrical conductors 43, the contacts 38, the segments 40, through the electrical conductors 44 and the receptacle 45 to the electrical appliances on the trailer.

The upper part of the connecting means is elastically mounted on the rubber holder 46, so that the transverse stress acting on the pivot pin 1 of the coupling body 3, is not transmitted to the coupling device.

When the hub 4 is disengaged from the pivot pin 1, the slide valve 20 is placed by the spring 47 across the ports 22 of the tube 17 so as to close them and to prevent the oil from flowing out of the hydraulic system of the trailer. The slide valve 18 is moved upwards by the spring 48 until the ports 23 are moved out of communication with the recess 24 thus sealing off the hydraulic system. At the same time, the air valve 30 re-engages the seat 49 and the air circuit is closed.

We claim:

1. An articulating coupling for an articulated vehicle whereof one part comprises a hub having a vertical axis and separate coupling elements for pneumatic, hydraulic and electric services disposed within the hub, and whereof the other part comprises a bearing for supporting the hub when the coupling is engaged, a hollow pivot pin mounted in the bearing for vertical movement therefrom into the hub and provided with rack teeth, a toothed sector meshed with the said rack teeth, a cylinder and a piston therein one of which is operatively connected to the sector to rock it and thereby move the pivot pin vertically in the bearing, locking means for locking the pivot pin in its upper position, separate coupling elements for pneumatic, hydraulic and electrical services disposed within the pivot pin each to engage automatically the corresponding element in the hub when the pivot pin is engaged in the hub, and a cover movably mounted on the bearing, said cover being spring biased to close the top of the bearing and to enclose the top of the pivot pin, and arranged to be displaced by the hub as the latter is slid into the bearing.

2. An articulating coupling for an articulated vehicle whereof one part comprises a hub having a vertical axis and separate coupling elements for pneumatic, hydraulic and electric services disposed within the hub and whereof the other part comprises a bearing for supporting the hub when the coupling is engaged, a hollow pivot pin mounted in the bearing for vertical movement therefrom into the hub, power means for moving the pivot pin vertically in the bearing, locking means for locking the pivot pin in its upper position, separate coupling elements for pneumatic, hydraulic and electrical services disposed within the pivot pin each to engage automatically the corresponding element in the hub when the pivot pin is engaged in the hub, and a cover movably mounted on the bearing, said cover being spring biased to close the top of the bearing and to enclose the top of the pivot pin, and arranged to be displaced by the hub as the latter is slid into the bearing.

3. An articulating coupling for an articulated vehicle whereof one part comprises a hub having a vertical axis, a connecting tube fixed within the hub and formed with a lateral port adjacent its extremity, means for connecting the port to a hydraulic system, and a valve sleeve slidable on the connecting tube and biased to close said port, and whereof the other part comprises a bearing for supporting the hub when the coupling is engaged, a pivot pin mounted in the bearing for vertical movement therefrom into the hub when the coupling is engaged, and formed with a bore to receive the connecting tube, valve means forming part of a hydraulic system and comprising a slide valve in said bore biased toward its closed position but displaceable to its open position by the entry of the connecting tube into the bore, the pivot pin being concurrently operable to displace the valve sleeve to its open position whereby communication is established between the two hydraulic systems, and power means for moving the pivot pin vertically in the bearing.

4. An articulating coupling for an articulated vehicle whereof one part comprises a hub having a vertical axis, a connecting tube fixed within the hub and formed with a lateral port adjacent its extremity, means for connecting the port in a hydraulic system, and a valve sleeve slidable on the connecting tube and biased to close said port, and whereof the other part comprises a bearing for supporting the hub when the coupling is engaged, a pivot pin mounted in the bearing for vertical movement therefrom into the hub when the coupling is engaged, and formed with a bore to receive the connecting tube, which bore has an enlargement to register with the port in the connecting tube when the latter is fully engaged in the bore and when the valve sleeve is displaced by the end of the pivot pin to open said port, a slide valve which is slidable in said bore, is formed with a lateral port arranged for connection to a hydraulic system and is biased to an upper position in which its port is cleared by the wall of the bore in the pivot pin, which slide valve is displaced downwardly by the connecting tube, when the latter is fully entered into the bore, to bring its port into register with the enlargement in the bore, whereby the two ports are placed in communication with one another.

5. A coupling according to claim 3, wherein the hub and the pivot pin are formed with co-operating air passages and the slide valve is provided with a second valve element normally closing the air passage in the pivot pin but operable to open the said passage when the slide valve is displaced inwardly into the bore in the pivot pin.

6. A coupling according to claim 3, comprising a skirt surrounding the connecting tube to provide an annular air space, means for connecting said annular space to a pneumatic system, a hollow body provided within the pivot pin, through which hollow body the said bore extends, which enters the skirt when the pivot pin is raised into the hub, and is formed with a passage leading to a valve chamber around the slide valve, a valve seating within the chamber, a second valve mounted on the slide valve and normally seated in the valve seating but movable away from the seating when the slide valve is displaced inwardly in the bore, and means for connecting the valve chamber to a pneumatic system.

7. A coupling according to claim 3, comprising a skirt surrounding the connecting tube to provide an annular air space, means for connecting said annular space to a pneumatic system, a hollow body provided within the pivot pin, through which hollow body the said bore extends, which enters the skirt when the pivot pin is raised into the hub, and is formed with a passage leading to a valve chamber around the slide valve, a valve seating within the chamber, a second valve mounted on the slide valve and normally seated in the valve seating but movable away from the seating when the slide valve is displaced inwardly in the bore, means for connecting the valve chamber to a pneumatic system, two co-operating sets of electrical contact elements, one set mounted on the outside of the skirt and the other mounted on an inner wall of the pivot pin, and means for connecting the contact elements to an electrical circuit.

8. An articulating coupling for an articulated vehicle whereof one part comprises a hub having a vertical axis, a connecting tube fixed within the hub and formed with a lateral port adjacent its extremity, means for connecting the port to a hydraulic system, a resilient mounting for said connecting tube, and a valve sleeve slidable on the connecting tube and biased to close said port, and whereof the other part comprises a bearing for supporting the hub when the coupling is engaged, a pivot pin mounted in the bearing for vertical movement therefrom into the hub when the coupling is engaged, and formed with a bore to receive the connecting tube, valve means forming part of a hydraulic system and comprising a slide valve in said bore biased toward its closed position but displaceable to its open position by the entry of the connecting tube into the bore, the pivot pin being concurrently operable to displace the valve sleeve to its open position whereby communication is established between the two hydraulic systems, and power means for moving the pivot pin vertically in the bearing.

9. A coupling according to claim 3, comprising a skirt surrounding the spigot to provide an annular air space, means for connecting said annular space to a pneumatic system, a resilient mounting for said connecting tube and skirt, a hollow body provided within the pivot pin, through which hollow body the said bore extends, which enters the skirt when the pivot pin is raised into the hub and is formed with a passage leading to a valve chamber around the slide valve, a valve seating within the chamber, a second valve mounted on the slide valve and normally seated on the valve seating but movable away from the seating when the slide valve is displaced inwardly in the bore, and means for connecting the valve chamber to a pneumatic system.

10. A coupling according to claim 3, comprising a skirt surrounding the connecting tube to provide an annular air space, means for connecting said annular space to a pneumatic system, a resilient mounting for said connecting tube and skirt, a hollow body provided within the pivot pin, through which hollow body the said bore extends, which enters the skirt when the pivot pin is raised into the hub, and is formed with a passage leading to a valve chamber around the slide valve, a valve seating within the chamber, a second valve mounted on the slide valve and normally seated on the valve seating but movable away from the seating when the slide valve is displaced inwardly in the bore, means for connecting the valve chamber to pneumatic system, two co-operating sets of electrical contact elements, one set mounted on the outside of the skirt and the other mounted on an inner wall of the pivot pin, and means for connecting the contact elements to an electric circuit.

References Cited in the file of this patent

UNITED STATES PATENTS

| | | |
|---|---|---|
| 1,766,780 | Finch | June 24, 1930 |
| 2,053,614 | Johnson et al. | Sept. 8, 1936 |
| 2,733,931 | Reid et al. | Feb. 7, 1956 |

FOREIGN PATENTS

| | | |
|---|---|---|
| 464,077 | Great Britain | Apr. 12, 1937 |